(12) United States Patent
Steinbrecher et al.

(10) Patent No.: US 11,447,186 B2
(45) Date of Patent: Sep. 20, 2022

(54) COWL WITH INTEGRATED WATER MANAGEMENT

(71) Applicant: Toyota Motor Engineering & Manufacturing North America, Inc., Plano, TX (US)

(72) Inventors: Robert C. Steinbrecher, Dexter, MI (US); Nicholas H. Augustyn, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 203 days.

(21) Appl. No.: 17/002,923

(22) Filed: Aug. 26, 2020

(65) Prior Publication Data

US 2022/0063729 A1 Mar. 3, 2022

(51) Int. Cl.
*B62D 25/08* (2006.01)
*B60R 13/08* (2006.01)
*B62D 25/24* (2006.01)

(52) U.S. Cl.
CPC ........ *B62D 25/081* (2013.01); *B60R 13/0815* (2013.01); *B62D 25/24* (2013.01)

(58) Field of Classification Search
CPC .. B62D 25/081; B62D 25/24; B60R 13/0815; B60R 13/08; B60R 13/0838; B60R 13/0892
See application file for complete search history.

(56) References Cited

U.S. PATENT DOCUMENTS

| | | | |
|---|---|---|---|
| 4,976,491 A | 12/1990 | Hasimoto et al. |
| 6,086,144 A | 7/2000 | Kuwano |
| 6,224,143 B1 | 5/2001 | Koulchar et al. |
| 8,696,049 B2 | 4/2014 | Hagino et al. |
| 9,139,231 B2 | 9/2015 | Lacroix |

FOREIGN PATENT DOCUMENTS

| | | | |
|---|---|---|---|
| JP | H08310446 A | * | 11/1996 |
| JP | 2002514551 A | * | 5/2002 |

* cited by examiner

*Primary Examiner* — Lori L Lyjak
(74) *Attorney, Agent, or Firm* — Christopher G. Darrow; Darrow Mustafa PC

(57) ABSTRACT

A cowl assembly for a vehicle is provided with integrated water management without the need for drainage grommets or hoses. The cowl assembly includes at least one cowl panel disposed adjacent a rear section of an engine compartment and extending a distance across a transverse width direction of the vehicle. A cowl insulator component is disposed adjacent to the cowl panel, also extending across the transverse width direction of the vehicle. At least one region of a major surface of the cowl insulator component is provided with a fluid resistant barrier layer configured to route fluid in a direction away from the engine compartment.

20 Claims, 5 Drawing Sheets

COWL WITH INTEGRATED WATER MANAGEMENT

TECHNICAL FIELD

The present disclosure generally relates to cowl assemblies and, more particularly, to improved cowl assemblies having integrated water management features.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

A cowl assembly, also known as a cowling, generally includes one or more components arranged to define a covered area, optionally with a removable covering, for various items, such as vehicle accessories and engine components. For common passenger vehicles, a cowl assembly may be located adjacent the front part of a vehicle's frame and may provide support to one or more of the rear portion of the hood, windshield, dashboard, pedals, and instrument panel. For example, a cowl assembly may function to separate the passenger compartment or HVAC area from the engine compartment. Vents/louvers may be provided on a top panel or top grille portion of the cowl assembly and allow certain amounts of air into the engine compartment. In addition to air entering the cowl, water and other fluids (such as rain, windshield washer fluid, etc.) may also enter an interior area and thus need to be removed. Current cowl designs have drain vents in various panels that coordinate with grommets and/or rubber drain hoses in order to route water/fluids down and away from the engine components. The grommets and drain hoses may allow noise and hot air into the cowl area, which may negatively affect HVAC performance and interior sound.

Accordingly, it would be desirable to provide an improved cowl system and design for easily removing water and fluids, while eliminating drain hoses and additional components.

SUMMARY

This section provides a general summary of the disclosure, and is not a comprehensive disclosure of its full scope or all of its features.

In various aspects, the present teachings provide a cowl assembly for a vehicle. The cowl assembly includes at least one cowl panel disposed adjacent a rear section of an engine compartment and extending a distance across a transverse width direction of the vehicle. The cowl panel may define at least one fluid discharge opening. The cowl assembly includes at least one cowl insulator component, which may be disposed adjacent the cowl panel, also extending a distance across the transverse width direction of the vehicle. The cowl insulator component may include or define a first major surface facing the engine compartment and configured to insulate noise and vibration. The cowl insulator component may also include or define a second major surface, located opposite the first major surface, and facing the cowl panel. At least one region of the second major surface of the cowl insulator component includes a fluid resistant barrier layer configured to route fluid received from the at least one fluid discharge opening of the cowl panel. For example the fluid resistant barrier layer is configured for routing fluid in a direction away from engine components and/or the engine compartment.

In other aspects, the present teachings provide a cowl assembly for a vehicle with an integrated water management feature. The cowl assembly may include a plurality of cowl panels disposed adjacent a rear section of an engine compartment and extending a distance across a transverse width direction of the vehicle. A cowl insulator component is disposed adjacent to at least one of the plurality of cowl panels and also extends a distance across the transverse width direction of the vehicle. At least one region of a major surface of the cowl insulator component includes a fluid resistant barrier layer configured to route fluid in a direction away from the engine compartment. At least a portion of the major surface of the cowl insulator component may be molded or shaped to define at least one fluid drainage feature, integrated with the cowl insulator component, which may be aligned with at least one fluid discharge opening defined in the plurality of cowl panels.

In still other aspects, the present teachings provide a method for draining fluid collected from a cowl assembly. The method includes providing a cowl panel disposed adjacent a rear section of an engine compartment. The cowl panel is provided extending a distance across a transverse width direction of the vehicle. The cowl panel defines at least one fluid discharge opening. The method includes aligning a cowl insulator component adjacent to the cowl panel. The cowl insulator component is also provided extending across the transverse width direction of the vehicle. At least one region of a major surface of the cowl insulator component is provided with a fluid resistant barrier layer aligned with the at least one fluid discharge opening of the cowl panel. The fluid resistant barrier layer is configured for routing and draining fluid in a direction away from the engine compartment.

Further areas of applicability and various methods of enhancing the disclosed technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide cowl assemblies for vehicles that use less components and afford improved drainage of water/fluid away from various engine components, while minimizing any direct noise or air paths traveling from an engine compartment and entering a passenger compartment.

More specifically, a cowl assembly for a vehicle is provided with an insulator component having integrated water management—without the need for additional drainage grommets and/or rubber hoses to direct the drainage of fluid from an interior of the cowl area. In various aspects, the cowl assembly includes at least one cowl panel disposed adjacent a rear section of an engine compartment and extending a distance across a transverse width direction of the vehicle. A cowl insulator component is disposed adjacent to the cowl panel, also extending across the transverse width direction of the vehicle. At least one region of a major surface of the cowl insulator component, for example, the inner major surface facing the cowl panel(s), is provided with a fluid resistant barrier layer that is configured to route fluid in a direction away from the engine compartment. This eliminates the need to use grommets and rubber hoses previously incorporated with the cowl panel(s) in order to route fluid away from engine components and/or the engine compartment.

Figure 1:
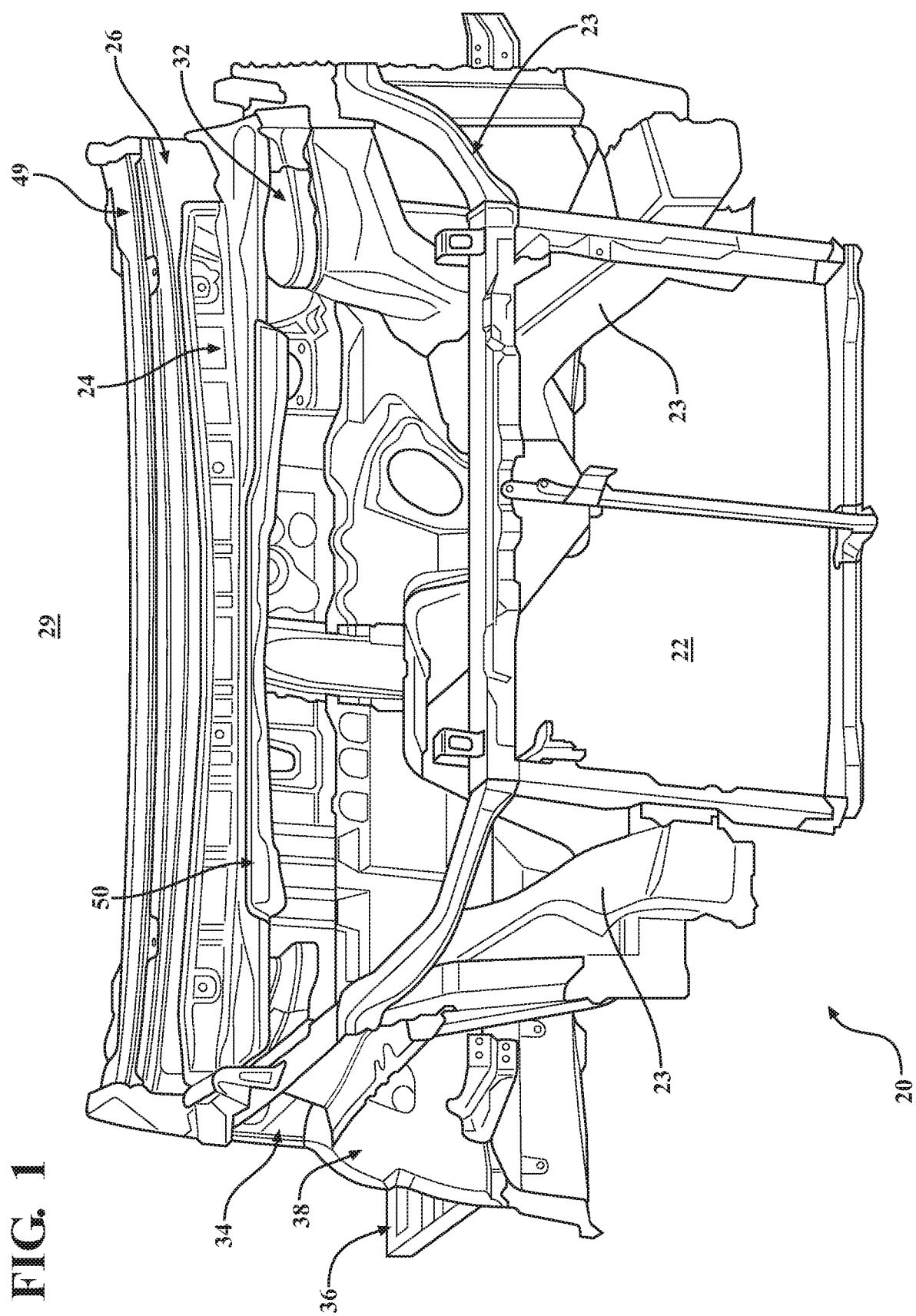
FIG. 1 is an isometric front view of a portion of a vehicle body structure providing an environmental view of an engine compartment with certain components located adjacent an exemplary cowl assembly.
Figure 2:
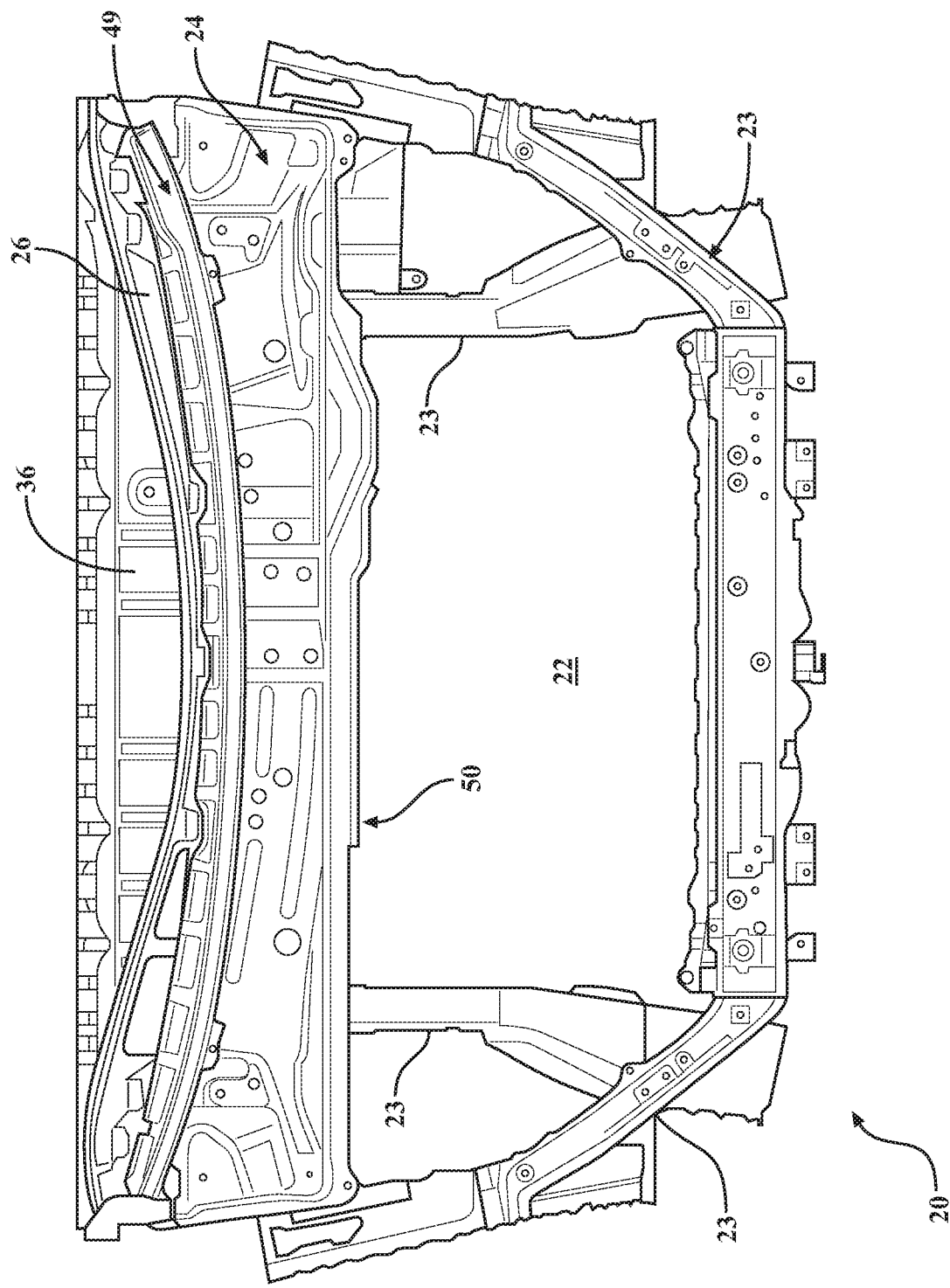
FIG. 2 is a top plan view of the portion of the vehicle body structure of FIG. 1.
Figure 3:
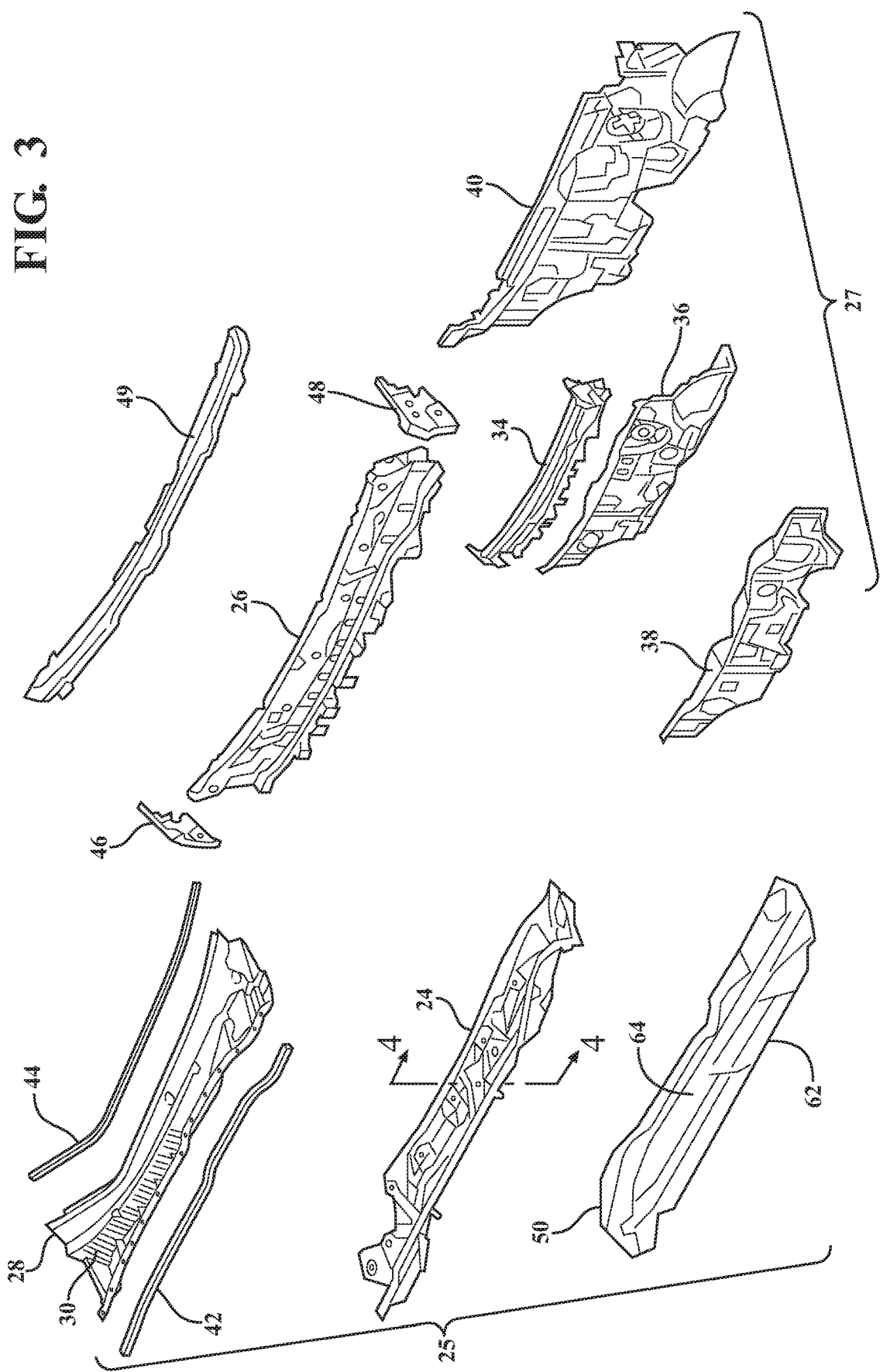
FIG. 3 is an exploded view of many of the vehicle body structure components provided in FIGS. 1 and 2 that may form part of a cowl assembly or are adjacent the cowl assembly.

FIG. 1 is an isometric front view of a portion of a vehicle body structure 20 providing an environmental view of an area of an exemplary engine compartment 22 with portions of a frame 23 and various other components that may be located adjacent to an exemplary cowl assembly 25. FIG. 2 is a top plan view of the portion of the vehicle body structure 20 of FIG. 1. In order to more fully understand the spatial relationship of the components, FIG. 3 is provided as an exploded view of certain of the vehicle body structure components provided in FIGS. 1 and 2 that may form part of the cowl assembly 25 and firewall 27 of the vehicle that generally separates the engine compartment 22 from the passenger compartment 29. Specific details of the engine and other common parts are not provided in order to better illustrate the cowl assembly 25 and aspects related to the present technology. It should be understood that the components and structure of cowl assemblies may vary based on different vehicle designs and requirements. While the present technology may be illustrated using various figures and components described herein, different vehicles may have different cowl designs that may influence the specific features, types, and sizes of the cowl panels and components. The descriptions and illustrations provided herein are exemplary in nature, however, and it is envisioned that the present technology can be useful with modifications as understood by those of skill in the art to correspond to different designs and applications with different vehicles.

With reference to FIGS. 1-3, the exemplary vehicle body structure 20 may include at least one cowl panel. For example, the figures illustrate a front cowl panel 24, a rear cowl panel 26, and a top cowl panel 28 (FIG. 3), sometimes referred to as a cowl grille or a cowl top ventilator that includes various louvers/apertures 30. Although these cowl panel components 24, 26, 28 are shown as one-piece panels, in certain designs the panels can be divided into multiple panels. As shown in FIGS. 1 and 2, the cowl panels 24, 26 are generally disposed adjacent a rear section of the engine compartment 22 and typically extend a distance across a transverse width dimension of the vehicle. In the example of FIGS. 1 and 2, the cowl panels 24, 26 extend a distance entirely across the engine compartment, located generally above the shock towers 32 at the sides of the engine compartment 22. In various aspects, a shock tower 32 is secured to body components framing an engine compartment and provides an attachment point for an upper end of a suspension damper, such as a strut or shock absorber. The cowl assembly 25 may be adjacent to the firewall components 27 such as a dash panel sub assembly 34, 36, which may include front and rear dash panel insulators 38, 40, respectively, best shown in FIG. 3.

FIG. 3 also provides additional components that may be coupled to or secured to the various panels 24, 26, 28. For example, there may be a number of sealing members 42, 44 configured for sealing with a hood and hood protector (not shown) of the vehicle. The rear cowl panel 26 may include side cowl panel gussets 46, 48 for coupling to other components, and an upper pad member 49 may be provided for additional sound insulation. In various aspects of the present technology, at least one cowl insulator component 50 may be provided disposed adjacent one or more cowl panel, such as the front cowl panel 24. Similar to the cowl front panel 24, the cowl insulator component 50 may extend a distance across the transverse direction of the vehicle. As shown in FIG. 1, the cowl insulator component 50 generally extends between the opposing shock towers 32, and thus may have a shorter length dimension than the front cowl panel 24.

Any number of cowl panel components can cooperate to form a cavity or channel that may house certain parts, such as windshield washer components or the like. The channel or cavity may collect water, rain, or other fluids such as windshield washer fluid, that should be removed or drained therefrom. The fluid removal, however, benefits from having pre-planned routes for the drainage because it may be detrimental for the fluid to make contact with certain engine components. As used herein, the term "fluid" is not meant to be limiting, and can include any type of liquid material that may encroach an interior area of a cowl assembly.

Figure 4:
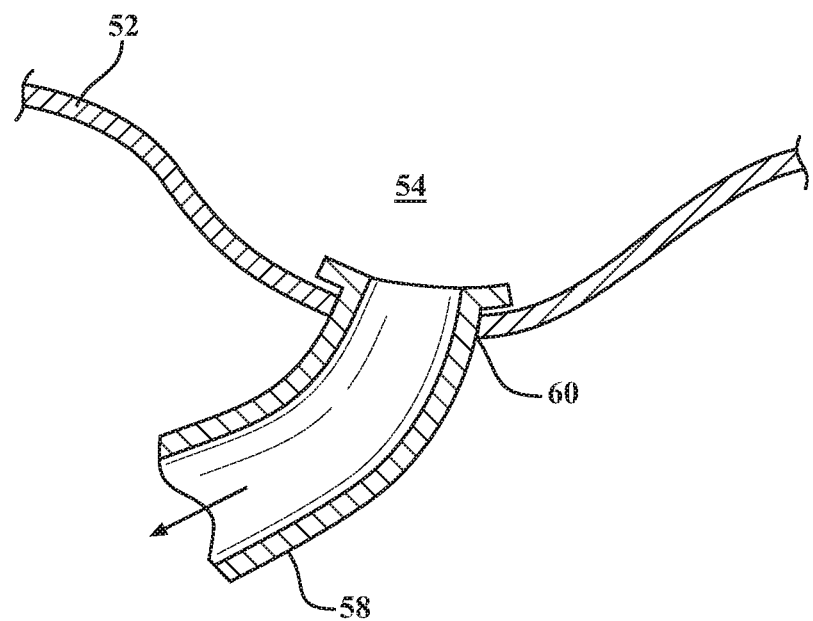
FIG. 4 is a schematic cross-sectional view of the front cowl panel taken along the line 4-4 of FIG. 3 that has been slightly modified for illustrating an example of prior art technology using a grommet/drain hose for removing fluid from an interior area or cavity of a cowl assembly.

FIG. 4 provides a schematic cross-sectional view of a prior art technology front cowl panel 52 component taken along the line 4-4 of FIG. 3 that has been slightly modified for illustrating an example of existing technology using a grommet/drain hose for removing fluid from an interior area 54 or cavity of a cowl assembly. Various prior art designs included one or more of a rubber grommet 56 and/or a drain hose 58 provided in a sizable aperture 60 defined in the cowl panel 52 in order to route fluid into an area where it could subsequently be drained or drop freely to the ground. While the prior designs may be able to route the fluid around engine components that should not get wet and ultimately to an appropriate location on the side of a vehicle or to the ground, the additional grommets, nozzles, and hose components add cost to the assembly, and also provided an opportunity for noise, vibration, and heat to travel through to an interior area 54 of the cowl assembly and ultimately enter the passenger compartment.

Figure 5:
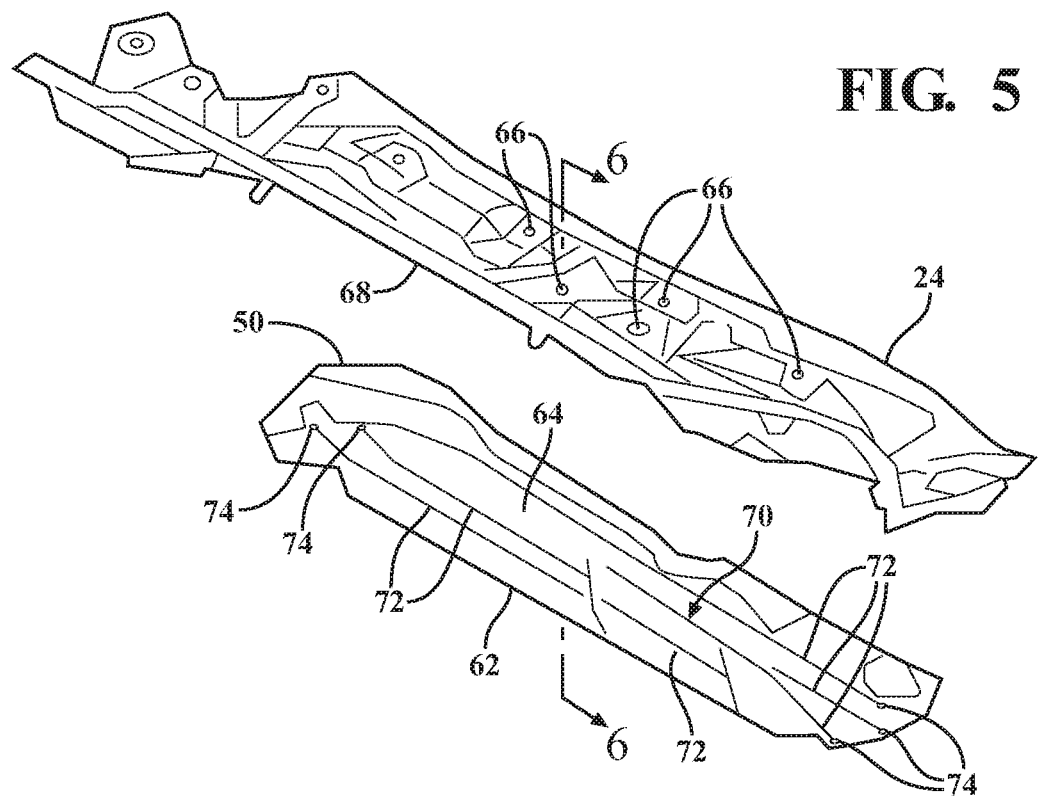
FIG. 5 is a magnified view of the front cowl panel and cowl insulator component from FIG. 3 according to one aspect of the present technology.

FIG. 5 is a magnified view of the front cowl panel 24 and cowl insulator component 50 from FIG. 3 according to one aspect of the present technology. In various aspects, the cowl insulator component 50 may be a thin, shaped pad and may include first and second opposing major surfaces. When in an assembled state disposed adjacent one or more cowl panel, for example, the cowl insulator component 50 may define what may be referred to as an exterior, or lower major surface 62 generally facing the engine compartment and configured to insulate noise and vibration. The cowl insulator component 50 may also include or define what may be referred to as an interior, or upper major surface 64, located opposite the bottom major surface, and facing the cowl panel(s). As shown in FIG. 5, and distinct from the prior art design shown in FIG. 4, the front cowl panel 24 may be provided with one or more fluid discharge openings 66 defined in strategically located areas. These fluid discharge openings 66 may be provided with a substantially smaller diameter than the aperture 60 provided in the prior art design (FIG. 4), which needed to be appropriately sized to receive the grommets and rubber hoses. In this regard, the smaller openings do not provide the same size passageway for the undesired introduction of noise, vibration, and heat to an interior area of the cowl.

In various aspects, the underlying or base material that forms the cowl insulator component 50 is not meant to be limiting, and in various aspects may be the same or a similar composition to one of various other commonly used engine compartment insulation materials that may be useful in keeping heat and noise in the engine compartment, or engine bay, from ultimately reaching an interior of vehicle. For example, certain locations in engine compartments may include various thermal insulation protects drivers, operators, and passengers from high temperatures that can also damage on-board electronics and advanced electrical systems that are commonly found in current vehicles. Thermal insulation may also be combined with acoustic insulation that serves to dampen sound-induced vibrations and protects personnel from decibel levels that can, in some instances, be harmful to human hearing. In particular with the present teachings, however, the upper major surface 64 of the cowl insulator component 50 is provided having a waterproof material, which can be provided as a fluid impervious layer that is disposed on at least one region of the upper major surface 64 ultimately facing the cowl panel(s).

Figure 6:
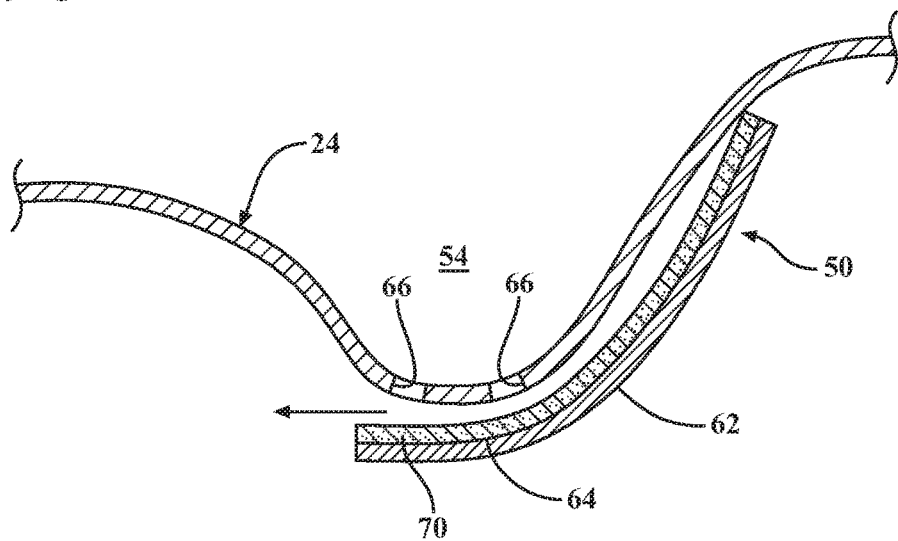
FIG. 6 is a cross-sectional view taken along the line 6-6 of FIG. 5 that is shown with a major surface of the cowl insulator component including a fluid resistant barrier layer and aligned adjacent a drainage opening from the front cowl panel.

FIG. 6 is a cross-sectional view taken along the line 6-6 of FIG. 5 that is shown with a major surface of the cowl insulator component including a fluid resistant barrier layer and aligned adjacent a fluid discharge opening from the front cowl panel. In an assembled state, at least a portion of the upper major surface 64 of the cowl insulator component 50 will be immediately adjacent to an outer surface 68 of the front cowl panel 24. The cowl insulator component 50 may be mechanically fastened to the front cowl panel 24 in certain locations. At least one region of the upper major surface 64 of the cowl insulator component 50 includes a fluid resistant barrier, or layer 70 that is substantially impermeable to fluid and is configured to route fluid received from one or more spaced-apart fluid discharge opening(s) 66 defined in the cowl panel 24. For example the fluid resistant barrier layer 70 may be strategically located on the upper major surface 64 to be aligned with at least one fluid discharge opening 66 and configured for routing fluid in a direction away from engine components and/or the engine compartment. In certain aspects, an entirety of the upper major surface 64 of the cowl insulator component 50 may be provided with the fluid resistant barrier layer 70. The material that forms the fluid resistant barrier is not meant to be limiting, and may include various materials that exhibit a relatively high degree of hydrophobicity and/or promote fluid movement or runoff. For example, it can include an oil based coating, a polymer, a resin, a wax, and other known hydrophobic materials. In various aspects, the fluid resistant barrier layer 70 can be a layer of material secured to the upper major surface 64 using a suitable adhesive or with mechanical fasteners. It may also be applied as a coating composition that is applied to at least one region on the cowl insulator component 50.

Figure 7:
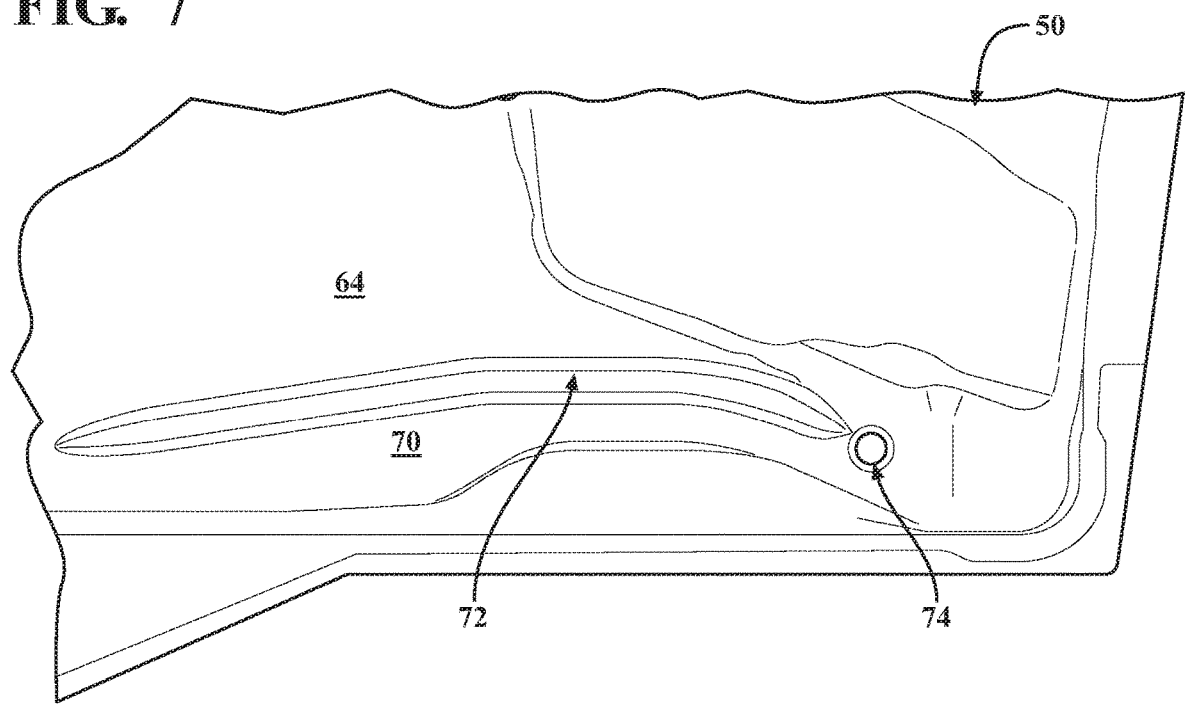
FIG. 7 is a plan view of an exemplary cowl insulator component to illustrate an interior major surface of a drainage feature provided as a drain channel, shaped or molded in the major surface, and in fluid communication with a drain opening.

FIG. 7 is a partial top plan view of an exemplary cowl insulator component to illustrate an interior major surface 64 as being molded or shaped to define at least one fluid drainage feature. In various aspects, the drainage feature may be provided as one or more drain path channel 72, shaped or molded into the upper major surface 64 and/or the fluid resistant barrier layer 70, and ultimately in fluid communication with one or more drain opening 74 in the cowl insulator component 50 that routes the fluid to a side of the vehicle and/or in a direction away from the engine compartment.

In addition to the cowl structural assembly and systems described above, the present teachings also provide methods for draining fluid collected from a cowl assembly. One exemplary method includes providing a cowl panel disposed adjacent a rear section of an engine compartment. As described above, the cowl panel may be provided generally extending a distance across a transverse width direction of the vehicle. The cowl panel may be one or more panels cooperating together, and at least one of the panel(s) defines at least one fluid discharge opening. The method includes aligning a cowl insulator component adjacent to the cowl panel. The cowl insulator component may also generally be provided extending across the transverse width direction of the vehicle. The method includes providing at least one region of a major surface of the cowl insulator component with a fluid resistant barrier layer that is aligned with the at least one fluid discharge opening of the cowl panel. The fluid resistant barrier layer is configured for receiving, routing, and draining fluid in a direction away from the engine compartment.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A cowl assembly for a vehicle, the cowl assembly comprising:
   a cowl panel disposed adjacent a rear section of an engine compartment and extending a distance across a transverse width direction of the vehicle, the cowl panel defining at least one fluid discharge opening; and
   a cowl insulator component disposed adjacent the cowl panel and extending across the transverse width direction of the vehicle, the cowl insulator component including:
      a first major surface facing the engine compartment and configured to insulate noise and vibration; and
      a second major surface located opposite the first major surface, and facing the cowl panel,
   wherein at least one region of the second major surface of the cowl insulator component comprises a fluid resistant barrier layer configured to route fluid received from the at least one fluid discharge opening of the cowl panel in a direction away from the engine compartment.

2. The cowl assembly according to claim 1, wherein the second major surface of the cowl insulator component is molded or shaped to define at least one fluid drainage feature.

3. The cowl assembly according to claim 2, wherein the fluid drainage feature comprises at least one drain channel.

4. The cowl assembly according to claim 3, wherein the at least one drain channel is in fluid communication with a drain opening defined in the cowl insulator component and configured to route fluid to a side of the vehicle.

5. The cowl assembly according to claim 2, wherein the cowl insulator component defines a plurality of drain channels and drain openings.

6. The cowl assembly according to claim 1, wherein an entirety of the second major surface of the cowl insulator component comprises the fluid resistant barrier layer.

7. The cowl assembly according to claim 1, wherein the fluid resistant barrier layer comprises a coating composition applied to the second major surface of the cowl insulator component.

8. The cowl assembly according to claim 1, wherein the cowl insulator component is mechanically fastened to the cowl panel.

9. The cowl assembly according to claim 1, wherein the cowl panel defines a plurality of spaced apart fluid discharge openings.

10. The cowl assembly according to claim 9, wherein the spaced apart fluid discharge openings are aligned in a position corresponding with the fluid resistant barrier layer of the cowl insulator component.

11. A cowl assembly for a vehicle, the cowl assembly comprising:
    a plurality of cowl panels disposed adjacent a rear section of an engine compartment and extending a distance across a transverse width direction of the vehicle; and
    a cowl insulator component disposed adjacent to at least one of the plurality of cowl panels and extending across the transverse width direction of the vehicle, at least one region of a major surface of the cowl insulator component comprising a fluid resistant barrier layer configured to route fluid in a direction away from the engine compartment.

12. The cowl assembly according to claim 11, wherein at least a portion of the major surface of the cowl insulator component is molded or shaped to define at least one fluid drainage feature aligned with at least one fluid discharge opening defined in one or more of the plurality of cowl panels.

13. The cowl assembly according to claim 12, wherein the fluid drainage feature comprises at least one drain channel.

14. The cowl assembly according to claim 13, wherein the at least one drain channel is in fluid communication with a drain opening defined in the cowl insulator component and configured to route fluid to a side of the vehicle.

15. The cowl assembly according to claim 12, wherein the cowl insulator component defines a plurality of drain channels and drain openings.

16. The cowl assembly according to claim 12, wherein an entirety of the major surface of the cowl insulator component comprises the fluid resistant barrier layer.

17. The cowl assembly according to claim 16, wherein the fluid resistant barrier layer comprises a coating applied to the major surface of the cowl insulator component.

18. A method for draining fluid collected from a cowl assembly of a vehicle, the method comprising:
    providing a cowl panel disposed adjacent a rear section of an engine compartment and extending a distance across a transverse width direction of the vehicle, the cowl panel defining at least one fluid discharge opening; and
    aligning a cowl insulator component adjacent to the cowl panel and extending across the transverse width direction of the vehicle, at least one region of a major surface of the cowl insulator component comprising a fluid resistant barrier layer aligned with the at least one fluid discharge opening of the cowl panel and configured for routing and draining fluid in a direction away from the engine compartment.

19. The method according to claim 18, wherein the major surface of the cowl insulator component is molded or shaped to define at least one fluid drainage feature aligned with at least one fluid discharge opening defined in cowl panel.

20. The method according to claim 19, wherein the fluid drainage feature comprises at least one drain channel in fluid communication with a drain opening defined in the cowl insulator component and configured to route fluid to a side of the vehicle.

* * * * *